United States Patent [19]

Burkam

[11] Patent Number: 4,477,225
[45] Date of Patent: Oct. 16, 1984

[54] ELASTOMERIC UNIVERSAL ROTOR HUB

[75] Inventor: John E. Burkam, Media, Pa.

[73] Assignee: The Boeing Company, Seattle, Wash.

[21] Appl. No.: 344,105

[22] Filed: Jan. 29, 1982

[51] Int. Cl.³ ............................................. B64C 27/52
[52] U.S. Cl. ................................ 416/134 A; 416/148;
464/91
[58] Field of Search ............... 416/134 R, 134 A, 102,
416/148; 464/89, 90, 91, 92, 93

[56] References Cited

U.S. PATENT DOCUMENTS

| | | | |
|---|---|---|---|
| 2,259,460 | 10/1941 | Dexter | 464/90 |
| 2,312,822 | 3/1943 | Julien et al. | 416/134 R X |
| 2,333,166 | 11/1943 | Fraser | 416/143 R |
| 2,369,538 | 2/1945 | D'Aubarede | 416/134 |
| 2,640,553 | 6/1953 | Hafner | 416/134 A X |
| 2,932,179 | 4/1960 | Grant | 464/76 |
| 3,518,025 | 6/1970 | Schmidt et al. | 416/131 |
| 3,804,552 | 4/1974 | Covington | 416/134 A |
| 4,297,078 | 10/1981 | Martin | 416/134 A |
| 4,323,332 | 4/1982 | Fradenburgh | 416/134 A |
| 4,333,728 | 6/1982 | Drees | 416/134 A |

Primary Examiner—Everette A. Powell, Jr.
Attorney, Agent, or Firm—Jones, Tullar & Cooper

[57] ABSTRACT

This invention is directed to helicopter rotor hubs which includes an elastomeric material between an inner and outer hub. The inclusion of elastomeric material transmits torque, thrust and in-plane loads and is flexible in the tilt direction.

11 Claims, 9 Drawing Figures

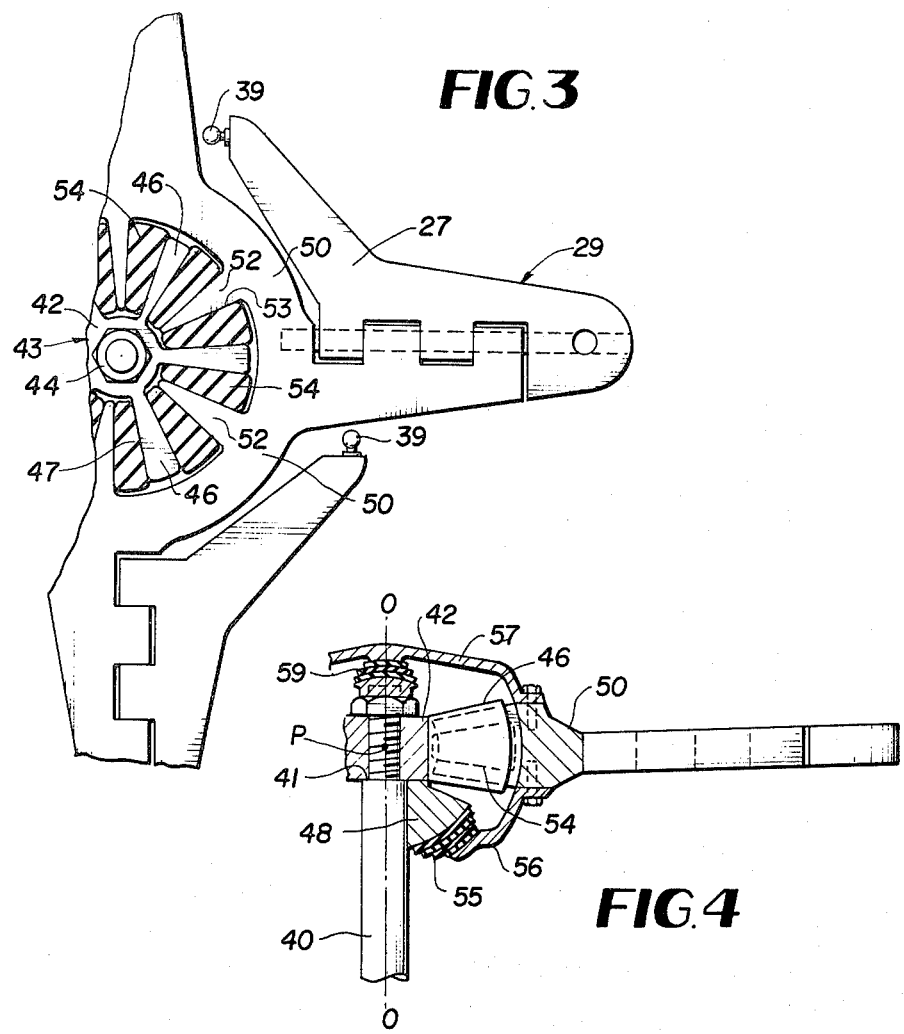
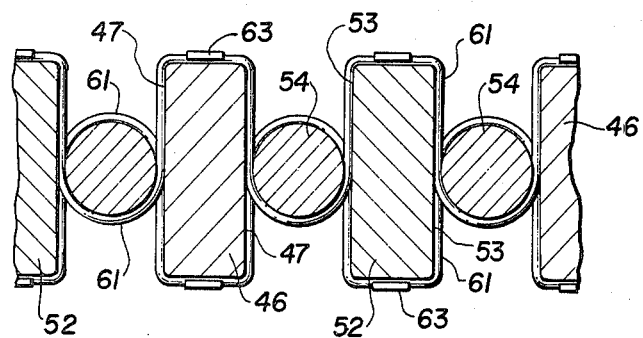

FIG.5
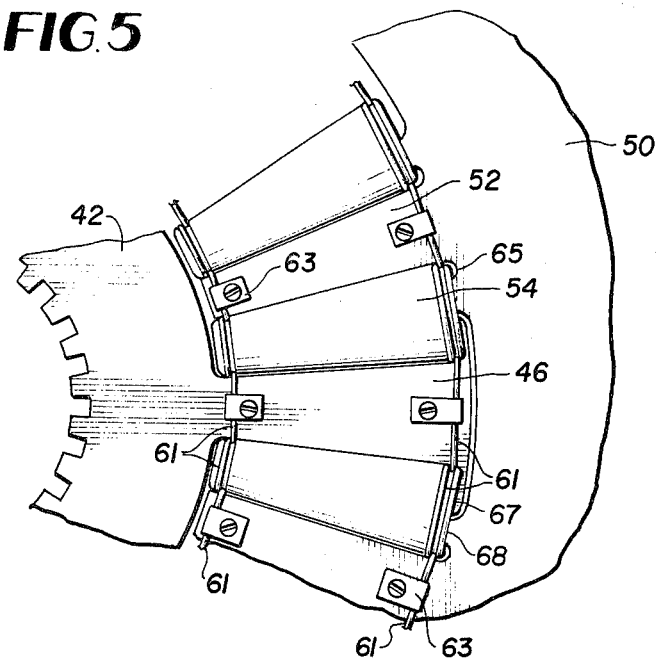
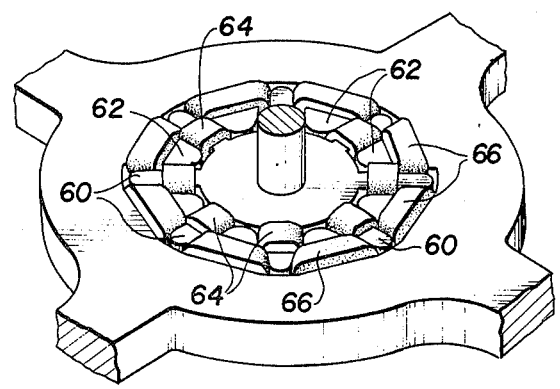
FIG.7

ELASTOMERIC UNIVERSAL ROTOR HUB

BACKGROUND OF THE INVENTION

This invention relates to hubs for securing and controlling rotors of a helicopter and more particularly to a hub including an elastomeric material which overcomes control problems.

Heretofore helicopter rotors have been secured to a rotatable shaft by various arrangements. Such arrangements use gimbals and other means which include bearings that make use of elastomeric material. It is well known in the prior art that operation of a helicopter creates conditions which exert G-forces on the fuselage, cause air and ground resonance, produce vibrations and many other problems.

Conventional articulated hubs require lag hinges to relieve coriolis and other lead-lag moments. Such hinges require lag dampers to prevent ground resonance. The coriolis forces also add together to cause in-plane hub loads. The low lag natural frequency causes the rotor blades to de-pattern in response to maneuvering acceleration transients, feeding forces back into the fuselage at right angles to the initial acceleration.

Soft in-plane hingeless rotors have no lag dampers but still have the same problems at set forth above. These problems also couple with in-flight rolling motion to produce a lightly damped or even unstable air resonance mode. Hingeless rotors also have strong gyroscopic coupling between pitch and roll control response and aircraft motions.

OBJECT AND SUMMARY OF THE INVENTION

This invention makes use of an inner hub which is secure to a rotatable shaft and an outer hub which is provided with outwardly extending door-type hinges to which the rotors are secured. Each of the hubs are provided with teeth that are directed toward each other alternately in an overlapped condition similar to gear teeth. Elastomeric material is placed between the teeth faces of adjacent teeth. A flange is provided for securing the outer ring in place by use of an elastomeric material secured to the lower half of the inner hub. The elastomeric material transmits thrust and is also flexible in the tilting direction.

It is therefore an object to provide an elastomeric universal rotor hub which reduces vibrations, eliminates air and ground resonance, reduces roll and pitch coupling in the controls and reduces hub drag.

The invention will be better understood, and further objects and advantages thereof will become more apparent from the ensuing detailed description of preferred embodiments taken in conjunction with the drawings.

BRIEF DESCRIPTION OF THE DRAWINGS

FIG. 3 is a partial top view of a modification of the rotor hub shown in FIG. 1;

FIG. 4 is a partial cross-sectional view of the rotor hub shown in FIG. 3;

FIGS. 5 and 6 illustrate a method of positioning rollers placed between the teeth extending from the inner and outer hubs;

FIG. 7 is a perspective view of another modification of the rotor hub shown in FIG. 1;

DESCRIPTION OF THE PREFERRED EMBODIMENTS

Figure 1:
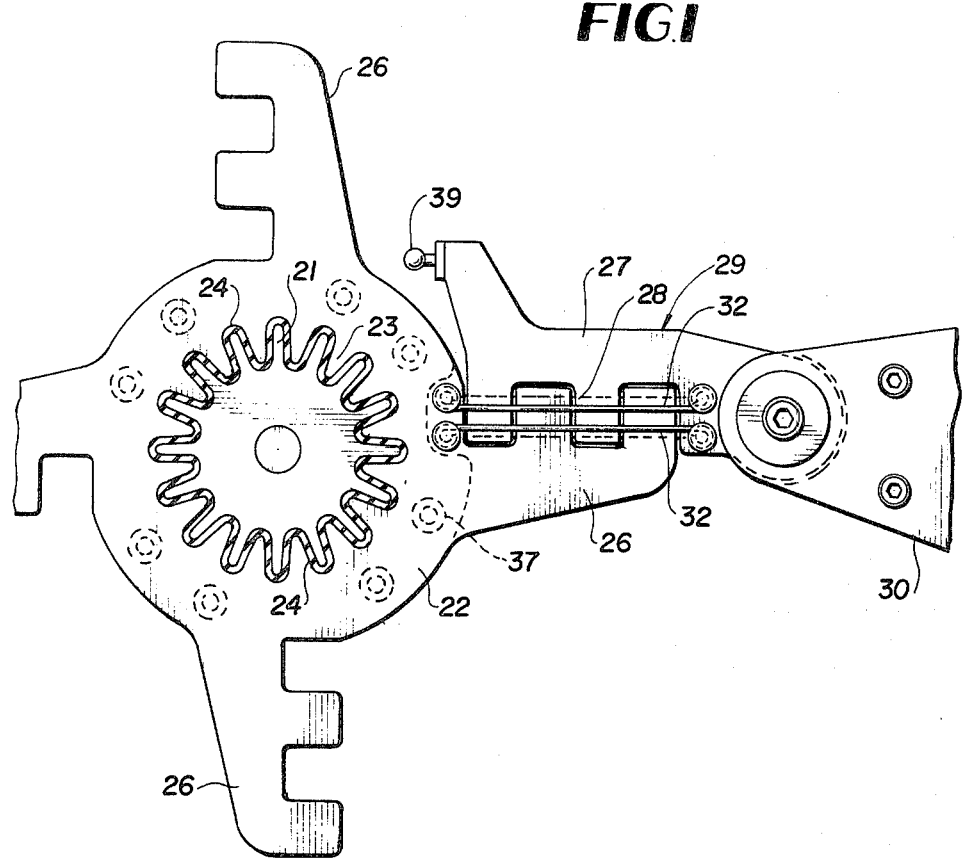
FIG. 1 is a partial top view illustrating the elements of the rotor hub of the invention.
Figure 2:
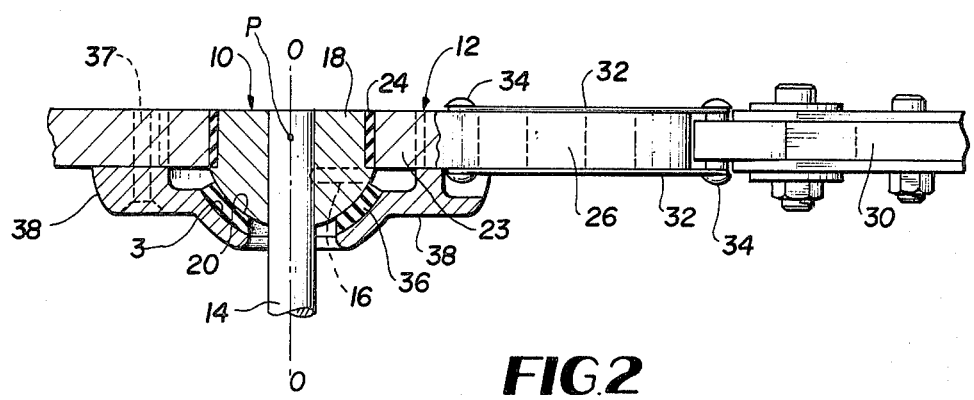
FIG. 2 is a partial cross-sectional view of the rotor hub.

Referring to FIGS. 1 and 2, there is shown an elastomeric universal rotor hub including an inner hub 10 and an outer hub 12 coaxial therewith. The inner hub 10 is secured to a drive shaft 14 by use of set screws 16, one of which is shown in FIG. 2. The inner hub 10 is formed by an upper cylindrical portion 18 and a bottom portion having a semispherical outer surface 20. The upper portion 18 is provided with radially outward extending teeth 21 oriented in the axial direction which are directed toward the outer hub 12. The outer hub 12 includes a circular or ring portion 22 from which teeth 23 are directed radially inwardly toward inner hub 10. The teeth 23 extend between teeth 21 and the inner and outer hubs are so related that a small spacing is retained between the ends of the teeth and the hubs. An elastomeric material 24 is placed between the adjacent faces of the teeth 21 and 23 and bonded to the faces of the teeth.

Projecting radially outwardly from the ring portion 22 are four equally spaced arms 26. A pitch arm 27 is pivotally connected to each arm 26 by pitch change bearings 28, to form a door-type hinge 29. Four rotor blades 30 are secured to the four pitch arms 27, respectively. Tension-torsion straps 32 in the form of fine wire are secured above and below each of the hinges 29 by suitable pins 34. Alternatively, the pitch change bearings 28 may be roller bearings and internal tension-torsion straps extending through the roller bearings may be used instead of the external straps 32.

The outer hub 12 is held in place by the elastomeric material 24 bonded to the radially extending hub teeth 21 and 23 and by an annular ring of elastomeric material 36 bonded to the inner hub semispherical bottom surface 20 and to the semispherical inner surface 35 of an outer hub flange 38, which is secured to the outer hub ring portion 22 by bolts 37. The two semispherical surfaces 20, 36 are concentrically disposed about a pivot point P on the axis 0—0, about which the outer hub 12 is movable, with respect to the inner hub 10, against a restoring force exerted on the outer hub 12 by the elastomeric spring elements 24, 36. Control arms, not shown, are connected to each of the door-type hinges at 39 for controlling the flight of the helicopter.

The modification shown by illustration in FIGS. 3 and 4 is similar to that shown in FIGS. 1 and 2. As shown, a drive shaft 40 is provided with a cutdown end portion which provides a circular shoulder 41 upon which an upper cylindrical portion 42 of an inner hub 43 is secured by a nut 44. Projecting outwardly from the inner hub cylindrical portion 42 are wedge-shaped teeth 46 with flat sides 47. The teeth 46 are narrower at their base inner ends than at their free outer ends. A lower portion 48 of the inner hub 43 skirts the drive shaft and includes a semispherical bottom surface that extends equidistant from the pivot point P on the inner hub axis 0—0 outwardly from the drive shaft. The outer hub 50 is shown coaxial with the inner hub 43 and is provided with inwardly projecting wedge-shaped teeth 52 with flat sides 53. The teeth 52 are narrower at their free inner ends than at their base outer ends. Teeth 52 on the outer hub 50 intermesh with teeth 46 on the inner hub 43 and are spaced therefrom. In the spaces between the inner and outer hub teeth 46 and 52 are positioned tapered rollers 54 made of a hard elastomer. The tooth flat sides 47,53 are disposed and the rollers 54 are tapered so that during pivotal movement of the outer hub 50 about the pivot point P, the center line of each roller 54 always extends through the pivot point P. These tapered rollers 54 always roll up or down half the distance traversed by the outer hub 50 as the outer hub tilts with respect to the inner hub 43 about the pivot point P so that the roller center lines lie on the plane which bisects the angle between the outer and inner hubs. This allows the outer hub 50 to turn at a constant angular velocity in its plane regardless of the tilt of the hub 50 about its pivot point P. Since the rollers 54 have very little restraint on the vertical motion of the outer hub 50, rotor thrust can be taken through a circular bracket 56 which is fastened to the outer hub 50 by screws or bolts and which bears upwardly against the inner hub 43 through a semispherical laminated elastomeric bearing 55 extending at a constant radius about the pivot point P. This elastomeric sandwich bearing 55 is normally in compression but it has enough strength in tension to withstand small transient negative G-loading in flight, and of course the weight of the rotor while it is not turning. A certain amount of elasticity of the rollers 54 is required to accommodate the squeezing action of the teeth 46,52 over part of the revolution while the rotor is tilted, due to the imperfect kinematics of this type of universal joint.

A method of transferring downloads (e.g., its own weight) from the rotor to the shaft 40 is by means of a cap 57 bolted to the top surface of the outer part of the hub 50. This cap 57 presses on the shaft 40 through a spherical laminated rubber and metal sandwich 59 which extends about the pivot point P concentric with the semispherical laminated elastomeric bearing 55.

A method of keeping the tapered rollers 54 at the proper height between the inner hub teeth 46 and outer hub teeth 52 is shown in FIGS. 5 and 6. At each end of rollers 54 are two shallow grooves cut completely around the circumference of the rollers. A flexible cable 61 of non-extensible material, such as wire or monofilament nylon cord goes from the top of one tooth under the roller in a groove and up the other side over the top of the next tooth, under the next roller, and so on around the hub. Another cable 61 goes from the bottom of a tooth up over a roller and down under the next tooth, and so on. A metal clip 63 or some other fastening means clamps each cable 61 to the tooth where it goes over the tooth, so that a cable failure will not release the entire cable. The cables 61 at each end of the rollers 54 locate them vertically. It can be seen that as the outer teeh 52 go up or down and the inner teeth 46 remain fixed, the cables 61 ensure that the rollers 54 move exactly half as far as the outer teeth 52 do. This is what the roller 54 would do anyway of there were not slippage. If the pitch diameter of the cable grooves is the same as the diameter of the tapered cylindrical roller surface extended to that point, then there would no slippage of either the cables 61 or the rollers 54.

On the outer or big end of each roller 54 is a pad 65 of a low-friction, wear-resistant material which rubs against smooth surfaces 67,68 projecting from the inner teeth 46 and outer hub 50 respectively. Thus, radial movement of the rollers 54 due to centrifugal force and due to squeezing between adjacent teeth is prevented.

The use of the rollers 54 between the teeth 46,52 allows the outer hub 50 to turn at a constant angular velocity in its plane regardless of the tilt of the hub 50. Since the rollers 54 have very little restraint on the motion of the outer hub 50, rotor thrust is taken up by the laminated elastomeric bearings 55,59.

Alternatively, tapered rollers of tubular spring steel may be used instead of the hard elastomeric rollers 54.

FIG. 7 is directed to a modification which is similar to that of FIGS. 1 and 2. In this modification, the radially extending teeth 60,62 on the inner and outer hubs, respectively, are spaced from each other and separate strips of rubber material 64,66 are threaded alternately above and below the radially extending teeth. One rubber strip is inwardly of the other strip and is threaded above the teeth as the other rubber strip is threaded below the same teeth such that they alternate being above and below the same teeth.

Figure 8:
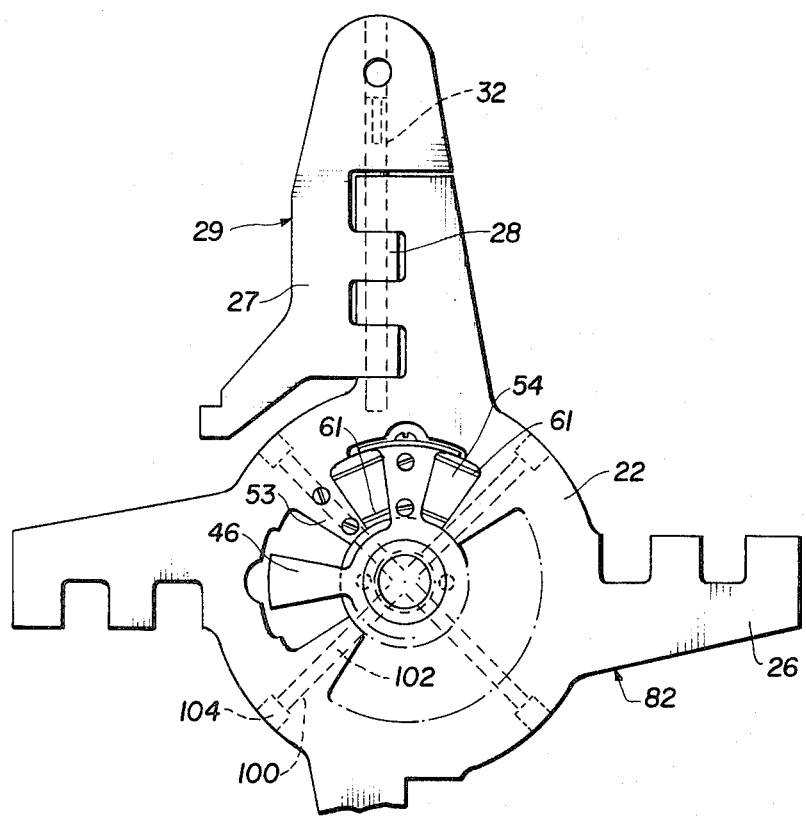
FIG. 8 is a partial top view of a modification of the embodiment shown in FIGS. 3-6.
Figure 9:
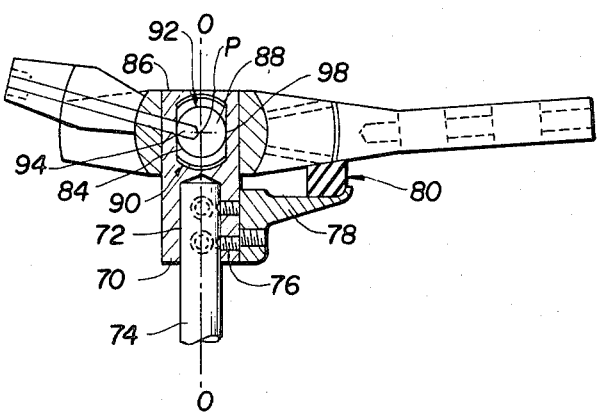
FIG. 9 is a partial cross-sectional view of the embodiment of FIG. 8.

FIGS. 8 and 9 are directed to a modification which is similar to that of FIGS.3–6. Elements as shown in FIGS. 8 and 9 which are essentially identical to like elements shown in FIGS. 3–6 have been identified by the same number. For example, the embodiment of FIGS. 8 and 9 includes the tapered rollers 54 of hard elastomer which are disposed between the inner hub teeth 46 and the outer hub teeth 52 and which are vertically constrained at each end by the cables or cords 61, in the same manner as described earlier for the embodiments of FIGS. 3–6.

As shown in FIGS. 8 and 9, the inner hub 70 includes an axial bottom bore 72 into which the drive shaft 74 extends and is secured thereto by said set screws 76. The inner hub 70 also includes a bottom flange member 78 carrying a rubber ring 80 which serves as an external teetering spring disposed between the inner hub 70 and the outer hub 82. The four arms 26 of the outer hub 82 extend outwardly and upwardly from the ring portion 22 of the outer hub 82 at a coning angle of approximately 4 degrees to the horizontal.

The inner hub 70 also includes an axial top bore 84 which is threaded at its upper portion to receive a threaded cap 86 closing the bore 84 and forming an axial compartment having semispherical top and bottom surfaces disposed equidistant from the pivot point p. A polished steel ball 88, which is disposed within this axial compartment, is positioned and restrained therein by semispherical laminated elastomeric bearings 90, 92 carried respectively by the inner hub 70 and the cap 86 so that the center of the steel ball 88 coincides with the pivot point P. The polished steel ball 88 has four radial bores 94 aligned with four vertically extending slots 98 extending through the inner hubs 70 and four bores 100 extending through the four outer hub teeth 52, respectively, and the outer hub ring portion 22. Four steel rods 102, which extend radially inward through the four outer hub bores 100 and four inner hub slots 98, and into the four bores 94 of the ball 88, respectively, have inner end portions which engage the steel ball 88 and enlarged threaded outer end portions 104 which engage respective threaded outer portions of the bores 100 to connect the polished steel ball 88 to the outer hub 82. In this way, rotor thrust is taken through the four steel rods 102 projecting into the steel ball 88, and the laminated rubber/metal bearings 90, 92 and spring 80 serve as internal teeter springs disposed between the inner and outer hubs. The slots 98 in the side of the inner hub allow the steel rods 102 to move up and down as the outer hub 82 tilts about its pivot point P relative to the inner hub 70.

Alternatively, solid Adiprene conical buttons may be used instead of the laminated rubber/metal springs 90, 92.

The use of elastomeric material, as set forth herein, transmits torque, thrust and in-plane loads while remaining flexible in the tilting direction. Torque is transmitted by compression in elastomeric material between the teeth of the inner and outer hubs. Thrust is taken through elastomeric material between an inner hub lower portion, and the outer hub. Thrust may also be taken through an inner hub upper portion and the outer hub.

The elastomeric material between the inner hub lower portion and the outer hub, or between both inner hub lower and upper portions, and the outer hub, has sufficient strength to withstand small, transient, negative G-loadings in flight and the weight of the rotors while they are not rotating. The elastomeric material permits sufficient movement between the inner and outer hubs such that the helicopter can be controlled in its normal manner.

The invention relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An elastomeric universal rotor hub which comprises:
   an inner hub having an axis and adapted to be connected to a rotor shaft for rotation about said axis, said inner hub including a cylindrical section and radially disposed teeth extending outwardly from the cylindrical section;
   an outer hub coaxial with said inner hub, said outer hub including a circular ring and radially disposed teeth extending inwardly from said ring between said inner hub teeth, respectively;
   an elastomeric material interposed between said inner hub teeth and said outer hub teeth;
   an annular flange connected to said inner and outer hubs; and
   a further elastomeric material interposed between the annular flange and one of said inner and outer hubs, and comprising part of the connection of the annular flange to said inner and outer hubs.

2. An elastomeric universal rotor as claimed in claim 1 in which said elastomeric material interposed between said inner hub teeth and said outer hub teeth is at least one thin strip of material.

3. An elastomeric universal rotor as claimed in claim 2, in which said elastomeric material interposed between said inner hub teeth and said outer hub teeth is threaded between the inner and outer ends of said teeth between the ends of said teeth and the respective hubs.

4. An elastomeric universal rotor as claimed in claim 3, in which said elastomeric material includes a pair of rubber strips which are threaded alternately above and below said teeth of said inner and outer hubs.

5. An elastomeric universal rotor hub as claimed in claim 1, in which said elastomeric material interposed between said inner hub teeth and said outer hub teeth includes rollers.

6. An elastomeric universal rotor as claimed in claim 5, in which said rollers are secured in their position between said teeth by a non-extensible material.

7. An elastomeric universal rotor as claimed in claim 5, wherein said non-extensible material is wire.

8. An elastomeric universal rotor hub, which comprises:
   an inner hub having an axis and adapted to be connected to a rotor shaft for rotation about said axis;
   an outer hub connected to the inner hub for rotation therewith and for limited motion with respect to the inner hub about a pivot point on said axis; and
   elastic means for connecting the inner and outer hubs;
   said inner hub including
      a cylindrical section,
      radially disposed teeth extending outwardly from the cylindrical section, and
      at least one semispherical surface equidistant from said pivot point;
   said outer hub including
      a circular ring extending about the inner hub cylindrical section,
      radially disposed teeth extending inwardly from said ring between said inner hub teeth, and
      at least one semispherical surface, concentric and co-extensive with said at least one inner hub semispherical surface, respectively; and
   said elastic means including
      first elastomeric material interposed between said inner hub teeth and said outer hub teeth, and
      second elastomeric material interposed between each pair of concentric and co-extensive semispherical surfaces of the inner and outer hubs.

9. A rotor hub, as described in claim 8, wherein:
   the inner hub comprises inner surfaces including said at least one inner hub semispherical surface, which define an axial compartment having at least one opening thereto;
   the outer hub comprises
      a center portion which is disposed within said axial compartment and which includes said at least one outer hub semispherical surface, and
      connecting means, extending through said at least one opening of the inner hub axial compartment, for connecting the center and ring portions of the outer hub.

10. A rotor hub, as described in claim 9, wherein:
    the at least one inner hub semispherical surface includes
       a top axial semispherical surface which forms a top surface of the inner hub axial compartment, and
       a bottom axial semispherical surface which forms a bottom surface of the inner hub axial compartment;
    the at least one opening to the inner hub axial compartment comprises a plurality of vertical slots which extend through side walls of the inner hub axial compartment;
    the outer hub center portion is embodied as a sphere whose center coincides with said pivot point;
    the connecting means comprises a like plurality of rods connected between said sphere and said ring and extending through the plurality of vertical slots, respectively; and
    the second elastomeric material comprises a top elastomeric material bonded to the inner hub top axial semispherical surface, and
a bottom elastomeric material bonded to the inner hub bottom axial semispherical surface.

11. A rotor hub, as described in claim 10, wherein: the inner hub further comprises a bottom flange; and
the elastic means further comprises a ring of elastomeric material disposed between the bottom flange and the teeth of the inner and outer hubs.

* * * * *